US012789161B2

(12) United States Patent
Thyagarajan et al.

(10) Patent No.: US 12,789,161 B2
(45) Date of Patent: Nov. 10, 2026

(54) SYSTEM AND METHOD FOR FEEDBACK-BASED COLLOID PHASE CHANGE CONTROL

(71) Applicant: Genesee Valley Innovations, LLC, Santa Clara, CA (US)

(72) Inventors: Krishnan Thyagarajan, Sunnyvale, CA (US); Christopher Somogyi, Wimberley, TX (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 525 days.

(21) Appl. No.: 17/875,969

(22) Filed: Jul. 28, 2022

(65) Prior Publication Data

US 2024/0033701 A1 Feb. 1, 2024

(51) Int. Cl.

*B01J 13/00* (2006.01)
*A23G 1/00* (2006.01)
*A23G 1/36* (2006.01)

(52) U.S. Cl.

CPC ........ *B01J 13/0086* (2013.01); *A23G 1/0009* (2013.01); *A23G 1/36* (2013.01); *A23V 2002/00* (2013.01)

(58) Field of Classification Search

CPC ....... B01J 13/0086; A23G 1/0009; A23G 1/36
See application file for complete search history.

(56) References Cited

U.S. PATENT DOCUMENTS

| | | | |
|---|---|---|---|
| 2,438,582 | A | 3/1948 | Southerwick |
| 7,237,400 | B2 | 7/2007 | Owada |
| 8,464,544 | B2 | 6/2013 | Shin et al. |

(Continued)

FOREIGN PATENT DOCUMENTS

| | | |
|---|---|---|
| CN | 108865881 | 11/2018 |
| CN | 110462314 | 11/2019 |

(Continued)

OTHER PUBLICATIONS

Italpres NPL, Jul. 22, 2019, https://web.archive.org/web/20190722230227/https://www.italpres.com/aluminium-die-casting-news/mechanical-properties-aluminum (Year: 2019).

(Continued)

*Primary Examiner* — Steven N Leff
(74) *Attorney, Agent, or Firm* — Leonid Kisselev

(57) ABSTRACT

A feedback system that identifies characteristics of a colloid and utilizes the characteristics to initiate and adjust a field applied to the colloid is provided. In one embodiment, the system leverages machine learning to automatically identify a condition of the colloid and adjust the supercooling parameters. Sensors are utilized during supercooling to monitor a condition of the colloid being supercooled. Specifically, characteristics of the colloid are measured at different points, areas, or volumes on the colloid and the measurements are used to determine whether supercooling is being achieved or whether the colloid is starting to freeze or undergoing another undesirable phase change. Based on the measurements, parameters of the field can be adjusted to ensure supercooling of the colloid without freezing or causing another undesirable phase change. When phase change is desired, rate of phase change can be controlled to achieve desired characteristics of the colloid.

14 Claims, 3 Drawing Sheets

(56) References Cited

U.S. PATENT DOCUMENTS

| | | | | |
|---|---|---|---|---|
| 10,588,336 | B2 | 3/2020 | Jun et al. | |
| 2002/0005043 | A1 | 1/2002 | Rudick et al. | |
| 2004/0069157 | A1 | 4/2004 | Lin | |
| 2007/0163275 | A1 | 7/2007 | Ha et al. | |
| 2007/0163289 | A1 | 7/2007 | Hahm et al. | |
| 2007/0196543 | A1 | 8/2007 | Lee et al. | |
| 2008/0053124 | A1 | 3/2008 | Cho et al. | |
| 2008/0245079 | A1 | 10/2008 | Lim et al. | |
| 2008/0245081 | A1 | 10/2008 | Shin et al. | |
| 2011/0165553 | A1 | 7/2011 | Elliott et al. | |
| 2013/0202752 | A1 * | 8/2013 | Tao | A23G 1/0006 426/244 |
| 2015/0118369 | A1 | 4/2015 | Hyde et al. | |
| 2015/0233631 | A1 | 8/2015 | Shuntich | |
| 2015/0264968 | A1 | 9/2015 | Shuntich | |
| 2016/0302457 | A1 | 10/2016 | Jun et al. | |
| 2017/0181455 | A1 | 6/2017 | Bullo et al. | |
| 2018/0045458 | A1 | 2/2018 | Shuntich | |
| 2018/0149422 | A1 | 5/2018 | Spivey et al. | |
| 2018/0180353 | A1 | 6/2018 | Shuntich | |
| 2019/0126203 | A1 | 5/2019 | Biegelsden et al. | |
| 2020/0056819 | A1 * | 2/2020 | Inada | A23B 2/08 |
| 2020/0312078 | A1 | 10/2020 | Deshpande et al. | |
| 2020/0323246 | A1 | 10/2020 | Jacobs et al. | |
| 2021/0131718 | A1 | 5/2021 | Jeong et al. | |
| 2021/0161182 | A1 | 6/2021 | Stoenescu et al. | |
| 2021/0403854 | A1 | 12/2021 | Koren et al. | |
| 2022/0003493 | A1 | 1/2022 | Park et al. | |
| 2022/0118136 | A1 | 4/2022 | Church et al. | |
| 2022/0211278 | A1 | 7/2022 | Dede et al. | |

FOREIGN PATENT DOCUMENTS

| | | | | |
|---|---|---|---|---|
| CN | 110906627 | | 3/2020 | |
| CN | 110953797 | | 4/2020 | |
| CN | 214593076 | | 11/2021 | |
| EP | 0765606 | | 4/1997 | |
| EP | 0584127 | B1 * | 12/1997 | B01J 13/0086 |
| EP | 1980809 | | 10/2008 | |
| EP | 2499924 | | 9/2012 | |
| GB | 2476834 | | 7/2011 | |
| JP | 2005291525 | | 10/2005 | |
| JP | 2009030961 | | 2/2009 | |
| KR | 20080003136 | | 1/2008 | |
| KR | 20080088943 | | 10/2008 | |
| KR | 20180054120 | | 5/2018 | |
| KR | 20220043324 | | 4/2022 | |
| WO | 2006100740 | | 9/2006 | |
| WO | 2008004761 | | 1/2008 | |
| WO | 2008004765 | | 1/2008 | |
| WO | 2008150104 | | 12/2008 | |
| WO | 2008153285 | | 12/2008 | |
| WO | I2015089112 | | 6/2015 | |
| WO | 2018187840 | | 10/2018 | |
| WO | 2020023747 | | 1/2020 | |
| WO | 2020138148 | | 7/2020 | |
| WO | 20210146122 | | 7/2021 | |

OTHER PUBLICATIONS

Laura Otero et al. "Effects of Magnetic Fields on Freezing: Application to Biological Products: Magnetic freezing of biological products?", Comprehensive Reviews in Food Science and Food Safety; vol. 15, No. 3, May 1, 2016 (May 1, 2016), pp. 646-667, XP055495395, US ISSN: 1541-4337, DOI: 10.1111/1541-4337.12202, p. 643, left-hand column.

Pirouzian Haniyeh Rasouli et al: "Pre crystallization process in chocolate: Mechanism, importance and novel aspects", Food Chemistry, Elsevier Ltd, NL, vol. 321, Apr. 1, 2020 (Apr. 1, 2020), XP086133616, ISSN: 0308-8146, DOI: 10.1016/J.FOODCHEM.2020.126718 [retrieved on Apr. 1, 2020].

* cited by examiner

SYSTEM AND METHOD FOR FEEDBACK-BASED COLLOID PHASE CHANGE CONTROL

FIELD

This application relates in general to temperature control and in particular, to a system and method for feedback-based colloid phase change control.

BACKGROUND

Colloids are mixtures in which undissolved particles of one substance (the "dispersed phase") are dispersed throughout another substance (the "continuous phase"), including suspensions, hydrocolloids, and emulsions. The dispersed phase and the continuous phase be liquid, solid, and gaseous substances, creating a range of colloids that have various uses in a variety of areas, including food, medicine, and cosmetics. For example, food items that are colloids include milk, mayonnaise, sweets, confectionary, pastries, ice-creams, chocolates, cream, dressings and sauces. Likewise, colloids that play an important role in healthcare include whole blood and blood products, saliva, urine, and breast milk. Due to their importance for human nutrition and healthcare, preserving the quality of such colloids and preventing pathogenic growth in them can be of prime importance.

However, current techniques for preserving the quality of colloids are inadequate. For example, freezing is commonly used to preserve and store food and other organic material, but is suitable for use with many colloids. When applied to colloids, the phase change caused by freezing can result in a separation of the dispersed phase and the continuous phase, causing colloidal collapse and thus destroying the qualities of the underlying product. Freezing is also time consuming. Furthermore, when a colloidal object is to be subsequently consumed, a thawing time needs to be accounted for before the object can be utilized. On the other hand, refrigeration reduces physical degradation, but induces rapid microbial and nutritional damages, thereby rendering refrigeration ineffective for long-term storage.

A further way that is currently used for preserving quality of colloids is addition of chemical agents such as emulsifiers that are used to ensure that the different components of the colloid do not separate or change phase. However, such additives can both affect the taste of the colloid and cause detrimental effects on the health of the person consuming the colloid, including negatively affecting the person's mental health. Further, the effect of such additives, once they are added, cannot be modulated, and achieving an effect on the colloid different from one that is originally intended becomes difficult once the additives are added.

The limitations of freezing, including freeze drying, refrigeration, and use of chemical agents for preservation can both be overcome by supercooling. Currently used supercooling techniques utilize fields, such as magnetic and electromagnetic fields, as described in U.S. Pat. No. 10,588,336, to Jun, to help preserve the physical, nutritional, and sensory characteristics of an object, such as a biological item, while subjecting the object to a temperature below the freezing point of water without freezing the object itself. This is enabled by the suppression or prevention of phase change of both intracellular and intercellular water in the intended object. The fields can include a pulsed/oscillating electric field, pulsed/oscillating magnetic field, or a combination of fields to reorient and induce vibration of water molecules in the object (among other physico-chemical controls), thus suppressing or preventing the formation of ice from the water molecules.

While applicable to many kinds of objects, supercooling is of a particular interest in preserving colloids. However, conventional techniques for supercooling do not account for differences in the composition of the colloids and do not allow for a near-real-time assessment of the status of the supercooled colloids to provide a closed-loop feedback, thus complicating achieving a desired result. In particular, achieving a state of supercooling requires an approach tailored to individual characteristics of the colloids being supercooled. For instance, based on the composition of a specific colloid, different field characteristics such as field strength, frequency, phase, and waveform, are necessary. Determining the correct characteristics and their values in order to achieve supercooling and prevent phase change and colloidal collapse can be difficult to determine due to many factors, including size, shape, and content of the colloid, and many of the general public may experience difficulty in maintaining supercooling conditions based on a lack of knowledge of colloid composition and lack of monitoring capabilities. In addition, the fields that were appropriate previously, may no longer be suitable for continuing the supercooling process.

Accordingly, a feedback system to monitor a colloid being supercooled and adjust parameters of the field to reach and maintain supercooling without causing colloidal collapse is needed. Preferably, the feedback system tailors the field applied to achieve supercooling based on characteristics of the colloid being supercooled, as the ability to change the supercooling characteristics on the fly is important to obtain optimum energy-efficient supercooling. Control over temperature and phase changes of a colloid for purposes other than supercooling is further desired.

SUMMARY

A feedback system that identifies characteristics of a colloid and utilizes the characteristics to initiate and adjust a field applied to the colloid is provided. In one embodiment, the system leverages machine learning to automatically identify a condition of the colloid and adjust the supercooling parameters. Sensors are utilized during supercooling to monitor a condition of the colloid being supercooled. Specifically, characteristics of the colloid are measured at different points, areas, or volumes on the colloid and the measurements are used to determine whether supercooling is being achieved or whether the colloid is starting to freeze or undergoing another undesirable phase change. Based on the measurements, parameters of the field can be adjusted to ensure supercooling of the colloid without freezing or causing another undesirable phase change. When phase change is desired, rate of phase change can be controlled to achieve desired characteristics of the colloid.

In one embodiment, a method for feedback-based colloid phase change control is provided. Values for one or more characteristics of a colloid are obtained at multiple time points and space points via one or more sensors. Parameters for at least one field to be applied to the colloid by at least one field generator are determined at each of the time points based on the characteristic values at that time point. Temperature and at least one of presence and absence of the phase changes of the colloid are controlled via application of the at least one field by the at least one field generator in accordance with the parameters determined at each of the time points.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

A feedback system can monitor characteristics or conditions of a colloid under supercooling conditions, determine new parameters for the supercooling fields applied, and make adjustments to the fields based on the new parameters to keep the colloid at a desired temperature to preserve the colloid's quality and extend the colloid's shelf life. Further, under some circumstances, a phase change of a colloid may be desired, and the rate at which cooling before, during, and after the phase change (such as freezing or melting) can affect the characteristics of the resulting colloids via altering the texture of the colloid. For example, the rate of cooling of cocoa butter can include influence the gastronomic properties of the resulting chocolate. Under these circumstances, the feedback system can be used to achieve the desired rate of cooling by adjusting the applied field based on changing characteristics of the colloid being cooled. In a still further embodiment, the feedback based system can be used to achieve a desired temperature of the colloid over a desired timeline without the colloid undergoing a phase change. The ability to control the temperature and phase changes of the colloids allows to add additional components to the colloid which otherwise could have led to a colloidal collapse, as well as to have greater control over the texture and visual properties of a product produced via the application of the field.

Figure 1:
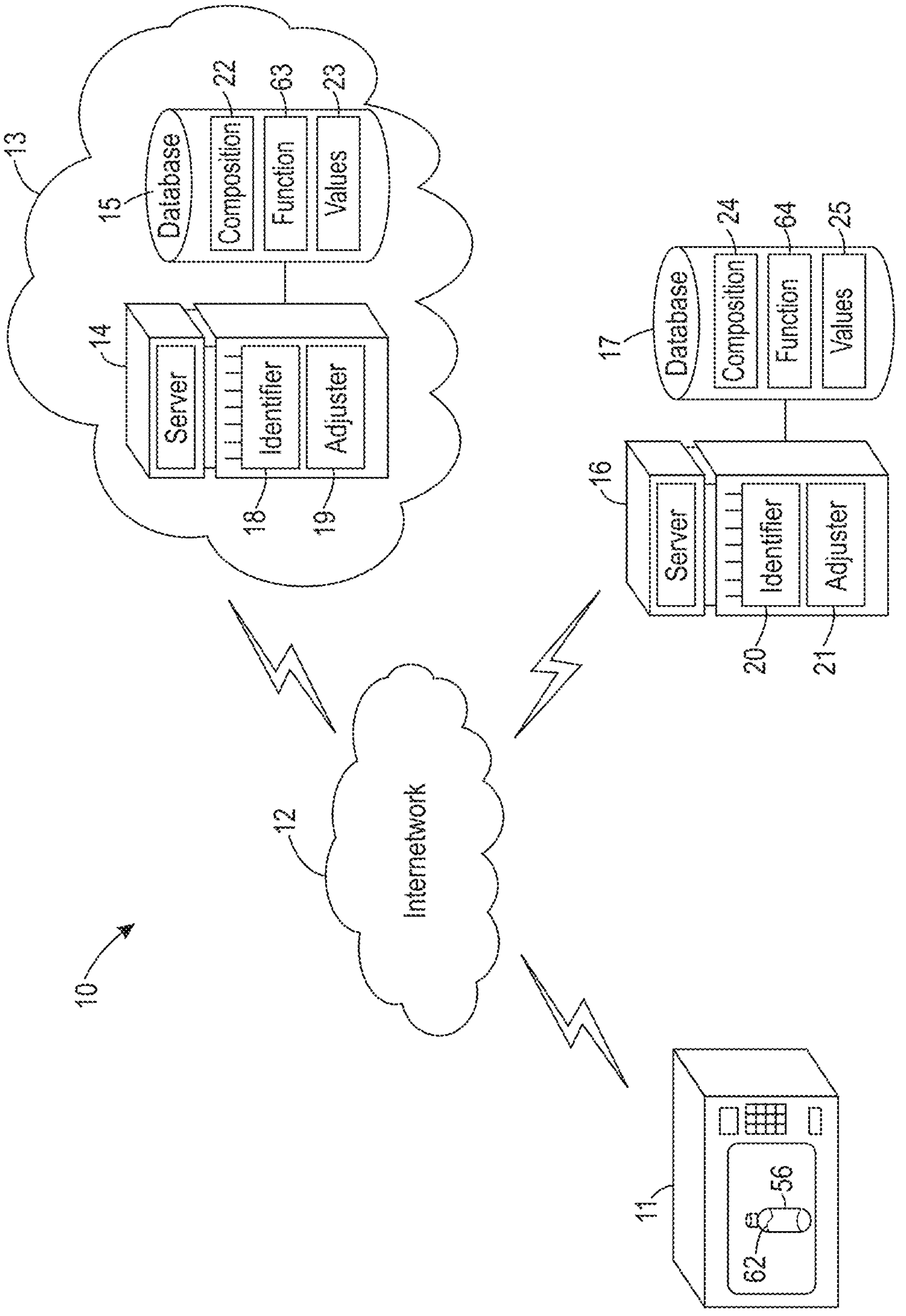
FIG. 1 is a block diagram showing a system for feedback-based colloid phase change control in accordance with one embodiment.

Utilizing a feedback system during supercooling helps prevent undesired phase changes in a colloid and allows to control the rate at which the product is cooled. FIG. 1 is a block diagram showing a system 10 for feedback-based colloid phase change control in accordance with one embodiment. A supercooling device 11 can supercool a colloid 62 to a temperature below the freezing point of water without freezing the colloid 62 by applying one or more fields to the colloid 62, including magnetic, electric, acoustic, and electromagnetic fields. Alternatively, the fields can also be used to control the point at which a phase change in a colloid does happen and the rate at which the colloid cools before, at, and after the phase change. The colloid 62 can be put within the device 11 within an external container 56 or without an external container. The supercooling device 11 can be a standalone device or can be incorporated into an appliance, such as a refrigerator or another freezer, and is described in detail below with respect to FIG. 3. The colloid 62 can be any item that includes a dispersed phase within a continuous phase, including suspensions, hydrocolloids, and emulsions, and can include a food item (including chocolate), an item used in cosmetics, a biological item that originates within a living organism or that is artificially made to resemble an item originating within a living organism, though still other kinds of colloids are possible. While in the description below, the colloid 62 is described as having a single dispersed phase, in a further embodiment, multiple substances could form multiple dispersed phases within the colloid 62.

As further described below, the applied field by the device 11 is specifically tailored based on identity and characteristics of the colloids whose phase change is being controlled, and optionally, if the colloid 62 is within a container 56 and the container can affect the application of the field (such as due to being of metal or another material that can affect the applied field), identity and characteristics of the container 56. The supercooling device 11 communicates with a feedback server 14, 16 via an internetwork 12, such as the Internet or cellular network, to obtain and adjust parameters of the field based on the obtained characteristics. In one embodiment, the feedback server 14 can be a cloud-based server. Alternatively, the server 16 can be locally or remotely located with respect to the supercooling device 11. The feedback server 14, 16 can include an identifier 18, 20 and an adjuster 19, 21. The identifier 18, 20 can utilize measurements for characteristics of the colloid 62 (and optionally the container 56) obtained from the supercooling device 11 to determine an identity or classification of the colloid (and optionally the container 56) based on known composition values 22, 24 of objects stored in a database 15, 17 associated with the server 14, 16. Machine learning can also be used in lieu of or in addition to a look up table of compositions and identities or classifications. In a further embodiment, identification or classification of a colloid 62 (and optionally the container 56) can occur on the supercooling device 11, such as via a processor, which is described in detail below with respect to FIG. 3.

The measurement values 23, 25 can further include values for the parameters of the field being applied. The adjuster 19, 21 utilizes data obtained from the supercooling device 11 regarding the colloid 62 (and optionally the container 56) and the field to determine whether the field should be adjusted to ensure an appropriate supercooling temperature is reached at a desired time and that only the desired phase changes take place. The adjustment can be determined using characteristic values 23, 25 for the colloid and parameter values 23, 25 for the field, which are stored by the databases 15, 17 to determine new parameter values for the field. In a further embodiment, ranges of object characteristics and field parameters can be stored on the supercooling device 11 for use in adjusting the supercooling fields applied to an object. Alternatively, machine learning can also be used to determine and adjust field parameters in lieu of a stored look up table of characteristic values and parameters.

Additionally, as the device can apply the fields for multiple purposes, a user can specify the desired result of the application of the fields as a function 63, 64 of the device 11. The adjuster 19, 21 can utilize the function 63, 64 selected for generation of the parameters. In particular, the function 63, 64 can specify whether the colloid 62 is to be supercooled to a below-freezing temperature without freezing (or otherwise changing phase) and the time over which the supercooling should be used to achieve the desired temperature as well as the time that the colloid 62 should stay at that temperature. Alternatively, if a phase change (such as freezing or melting) of either the dispersed phase, the continuous phase, or both phases of the colloid 62 are desired, the function can specify how quickly the phase change should happen, either in terms of a simple time limit or creating a correspondence between the temperature that the colloid 62 should be of at particular points in a time interval. Still other kinds of functions 63, 64 are possible. The function 63, 64 can be entered by the user through the user interface of the device 11 and then wirelessly provided to the adjuster 19, 21, or can be provided to the adjuster 11 through a further computing device, such as a mobile phone or a personal computer interfaced to the adjuster 19, 21 through the Internetwork 12.

Figure 2:
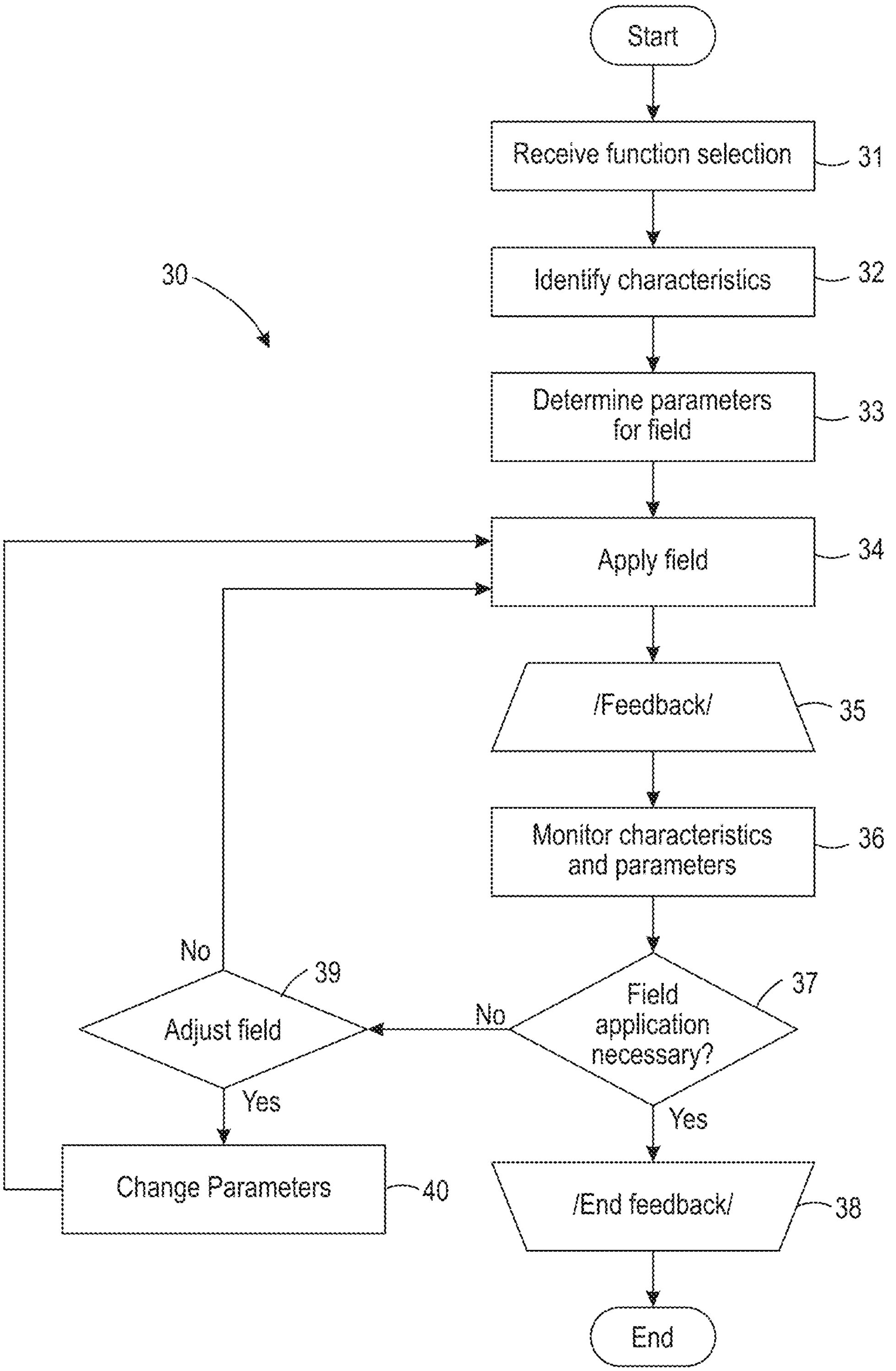
FIG. 2 is a flow diagram showing a method for feedback-based colloid phase change control in accordance with one embodiment.

The ability to automatically determine a composition of a colloid (and optionally the container 56), and determine and adjust parameters for supercooling helps to maintain supercooling conditions of the colloid, while avoiding unwanted phase transitions. FIG. 2 is a flow diagram showing a method 30 for feedback-based supercooling in accordance with one embodiment. The method 30 can be implemented using the system 10 of FIG. 1. A colloid 62 (either with or without a container 56) to be supercooled is placed into a supercooling device. Optionally, a function that the device needs to perform is received (step 31). A composition or particular characteristics of the colloid 56 (and optionally the container 56) is identified (step 31) via sensors. For example, one or more sensors can send signals towards the colloid 62 and information about the colloid 62 is obtained via the signal, which is returned back to the sensor. Passive and active sensors can be used, including imaging and reflective sensors, as well as electrocurrent sensors, optical sensors, chemical sensors, electrochemical sensors, acoustic sensors, and hyperspectral imaging. For example, a resistance of the colloid 62 can be measured using two electrodes to determine a fat content of the colloid 62 or hyperspectral imaging can be used to determine a surface roughness or chemical composition of the colloid. Measures for characteristics, such as density, water content, fat content, size, and shape, fraction percentage, chemical composition, agglomeration, stability as well as other characteristics, can be obtained via the sensors. As colloids have at least two components, the dispersed phase and the continuous phase, different portions of the colloid 62 could have different characteristics, and the characteristics could be associated either with one of the phases or with the colloid 62 as a whole. For example, proportions of the phases in the colloid 62 is a characteristics that is associated with the colloid 62 as a whole.

The identified characteristics can be used to classify the colloid 62 as a type of colloid 62 (such as whether the colloid 62 is a food or a biological liquid) or identify the specific colloid 62, such as a particular kind of food (such as mayonnaise or chocolate) or a biological liquid (such as urine or breast milk). The classification can also refer to the dispersed phase and the continuous phase, classifying them either by type or as particular substances. Additionally, if the identity of the colloid 62 as a colloid is not known before the initiation of the method 30, the identified characteristics can be used to determine the identity of the object in the device 11 as a colloid.

Classification or identification of a colloid 62 (and optionally the container 56) can occur via a camera, using a look up table, be provided by a user, or determined via machine learning. When used, a camera can obtain an image of the colloid 62 (and optionally container 56) that can be compared with a database of images to determine an identity of the colloid 62. The look up table can include characteristics, values for the characteristics, and identities or categories for the colloid 62 based on the identified characteristics and values.

If user provided, the user can provide the characteristics or an identity of the colloid 62 (and optionally the container 56) by entering the characteristics or identity into the supercooling device or an application for the supercooling device. Alternatively, during machine learning, values for the characteristics are input to classify the colloid 62 as having a particular identity or belonging to a particular category.

Initial parameters for a field applied during supercooling can be determined (step 33) based on the characteristics of the colloid 62 (and optionally the container 52), or the identity or classification of the colloid 62 (and optionally the container 56), if known. Specifically, when an identity of the colloid 62 (and optionally the container 56) is not known, one or more of the characteristics can be used to determine a type of field and initial parameters for the determined field. The field can include a magnetic field, electric field, an electromagnetic field, or a combination of fields. Other types of fields are possible.

Meanwhile, the field parameters can include amplitude, frequency, phase, waveform, and duration, as well as other types of parameters. Values for the parameters can be determined using a look up table, which can provide field parameter values for colloids based on a characteristic or a combination of characteristics, or based on an identity or classification of the colloids (in or outside of a container), and optionally, based on the entered function. If no function is entered, the parameters could be based on a default function (such as to supercool the colloid 62 to a temperature below freezing (such as −1 °C to −20°C) without the colloid 62 undergoing a phase change). In a further embodiment, machine learning can be used to determine the initial field parameters. The learning can be performed based on data sets of the characteristic values and parameters for fields to be applied to each of the different colloids. Once the parameters are determined, the field is then applied (step 34) to the colloid 62 based on the values of the parameters to initiate supercooling (or another desired effect) of the colloid 62.

To maintain progression towards desired result, a feedback system is run (step 35). While undergoing the application of the field, the colloid 62 (and optionally the container 56) can be monitored (step 36) continuously or at predetermined time periods to determine a condition of the colloid 62 (and optionally the container 56). For example, characteristics of the colloid 62 can be monitored, including temperature, impedance, hyperspectral imaging, acoustic sensing, and visible and infrared imaging. The colloid 62 can be monitored at different spatial points at different times or at the same time. The characteristics of the container 56 can be similarly monitored. Parameters of the applied field can also be monitored (step 36), including wavelength, frequency, phase, amplitude, waveforms, and duration. If at any time, application of the field is no longer necessary (such as if desired result has been achieved, or if removal of the colloid from the device 11 is detected) (step 37), monitoring of the colloid 62 ends and the feedback loop and application of the field are completed for that colloid (step 38).

However, if the colloid 62 remains in the supercooling device 11 under the applied field, the monitored characteristics of the colloid 62 and the parameters of the field can be used to determine whether the field needs to be adjusted (step 39). For example, if the desired goal (such as specified by the function 63, 64) is to keep the colloid under supercooling conditions, if the colloid 62 is determined to be under such conditions, such that the colloid 62 reaches a temperature between −1 °C and −20 °C, and no unwanted phase transition (such as nucleation of water molecules) in the colloid has commenced, no adjustments may be necessary and the field is continued (step 34). For example, ultrasonic sensors can be used to identify air pockets within a colloid and thus, a density of the object. A dense colloid has fewer air pockets for water than less dense colloid. If nucleation or freezing is beginning, the density of the colloid can change as the water in the air pockets freeze. The propagation of sound through ice and water are different as well, thus acoustic sensors can be used to determine the beginning of the formation of ice (if the formation occurs).

In the same scenario, if the colloid 62 appears to be close to or actually undergoing an unwanted phase change, adjustments to the field parameters should be made (step 40). The parameter adjustments can include a change in amplitude, frequency, phase, waveform, wavelength, and duration of the field, which can affect mobility, physical movement or ability of phase-change of water molecules in the colloid 62 to prevent or reverse nucleation. The field changes can be made manually or automatically. In one embodiment different formulas can be used to determine new parameter values based on the monitored characteristics of the colloid 62, as well as a graph of colloid characteristics and calibration of the fields. The chart can include values for the listed characteristics with standard deviations and known progression of time with temperatures for each colloid 62 with a particular characteristic or combination of characteristics to achieve supercooling. In a different embodiment, machine learning can be used to determine new values for the field parameters.

Returning to the above example, if at least one phase of the colloid 62 is determined to be undergoing an unwanted phase transition (such as nucleation or freezing), the field parameters can be adjusted. New values of the parameters can be determined via machine learning or a graph. For instance, if freezing is occurring, the frequency and wavelength of the field application to the colloid 62 may be increased to result in additional mobility of the water molecules to prevent freezing. After the parameters are changed, the field is applied (step 34) to the colloid 62 using the adjusted parameters and the feedback process continues (step 34). For example, a magnetic field can be changed by moving the magnets closer to or away from the colloid 62, or moving the magnets relative to one another. Movement of the magnets can be manual or automated.

Similarly, when the goal of the application of the field is for the colloid 62 to reach a particular temperature at a particular rate (with or without a phase transition), the temperature of the colloid 62 can be monitored. If the temperature does not correspond to a value that the temperature should be at a particular point of time, then the field can be adjusted. On the other hand, if the colloid temperature follows the desired timeline, no adjustment is made.

Figure 3:
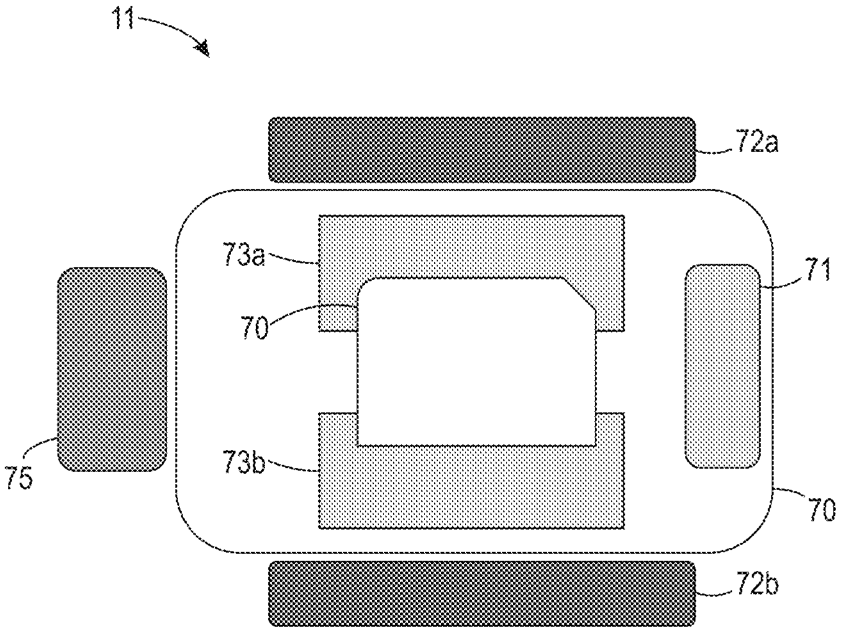
FIG. 3 is a block diagram showing, by way of example, a device for feedback-based colloid phase change control.

The device used to perform supercooling can vary in size depending on the colloids to be supercooled. FIG. 3 is a block diagram showing a top view of a device 11 for feedback-based colloid phase change control in accordance with one embodiment. The device 11 can include a receptacle 70 in which a colloid 62 is placed for the field to be applied. The receptacle 70 can include a container (which may be in addition to any other container 56 the colloid may be in), pan, or other type of receptacle for holding the colloid 62. In one embodiment, the receptacle 70 is placed into a standalone housing (not shown), similar to a microwave, to initiate supercooling or alternatively, can be incorporated into an appliance, such as a refrigerator.

One or more field generators 72 *a,b*, 73 *a,b* can be positioned with respect to the receptacle 70. The field generators can each include a magnet, electrode, wires, electromagnets, or other material systems, such as 2D materials, including for example, graphene, van-der-waals layered materials or organic conductive polymers. For example, electrodes 73 *a,b* can be positioned on a bottom side of the receptacle, along an interior surface, to generate a pulsed electric field. Other positions of the electrodes are possible, including on opposite sides (not shown) of the receptacle 70. When placed in a position other than the bottom of the receptacle, the electrodes can be affixed to walls of the standalone housing or walls of a housing, such as an appliance. The electrodes can be positioned to contact the colloid 62 or in a further embodiment, can be placed remotely from the colloid 62.

The device 11 can also include at least one magnet 72 *a, b*, such as an electromagnet, a permanent magnet, or a combination of magnets, to generate an oscillating magnetic, electric or electromagnetic field. Time-varying magnetic fields can be used to create electric fields and vice-versa. The magnets can be positioned along one or more sides of the receptacle 70, or can be affixed to the receptacle itself or the housing in which the receptacle is placed. In a further embodiment, the magnets can be remotely located from the receptacle and the field emitted from the magnets can be applied to the colloid 62 via one or more transducers. Other kinds of field generators are also possible. For example, the field generators could include a light generator or an acoustic field generatorz, though still other kinds of field generators are possible.

Further, at least one closed-loop monitoring sensor 71 can be provided adjacent to the receptacle on one or more sides. Alternatively or in addition, a sensor can be affixed to the housing, on an interior surface, in which the receptacle is placed for supercooling. The monitoring sensors can include imaging and reflective sensors, electrocurrent sensors, chemical sensors, electric sensors, acoustic sensors, optical sensors, electrochemical sensors, thermal sensors and imagers, and hyperspectral sensors. However, other types of sensors are possible.

An electrical control unit 75 can be a processor that is interfaced to the sensors 71, magnets 72 *a,b*, and electrodes 73 *a,b* to communicate during the feedback process. Specifically, the processor can determine an identity of or classify a colloid 62 for supercooling based on measurements from the sensors 71, as well as identify parameters for the field to be applied based on the identity or classification. The processor can also instruct the sensors 71 to measure characteristics of the colloid 62 (and optionally the container 56) undergoing supercooling and in turn, receive the measured values as feedback for determining if new parameters of the field are needed and if so, values of the parameters. Based on the feedback from the sensors, the processor can communicate the new parameter values with the magnets and electrodes to change the field applied to the colloid for changing the supercooling conditions.

In a further embodiment, the processor can obtain data from the sensors, electrodes, and magnets for providing, via a wireless transceiver included in the device, to a cloud-based server for determining an identity or classification of the colloid 62, determining initial parameters for the field, and identifying new field parameters for adjusting the field. When performed in the cloud, the data set of colloid identities and classifications, initial parameters, and guidelines for adjusted parameters can be utilized by different users. In contrast, when the processor of the device 11 performs such actions, the data sets are specific to that device 11.

While the description above focuses on colloids, the device and process described herein can also be applied to different kinds of objects including, raw, preserved or cooked foods, blood, embryos, vaccines, probiotics, medicines, sperm, tissue samples, plant cultivars, cut flowers and other plant materials, biological samples of plants, non-biologicals, such as hydrogel materials, material that can be impacted by water absorption, such as textiles, nylons and plastic lenses and optics, fine instruments and mechanical components, heat exchangers, and fuel, as well as ice as described in commonly-assigned U.S. Patent application, entitled "System and Method for Feedback-Based Beverage Supercooling," Ser. No. 17/876,049, filed Jul. 28, 2022, pending; ice as described in commonly-assigned U.S. Patent, entitled "System and Method for Controlling Crystallized Forms of Water," U.S. Pat. No. 12,392,535 issued Aug. 19, 2025; organic items as described in commonly-assigned U.S. Patent application, entitled "System and Method for Feedback-Based Nucleation Control," Ser. No. 17/876,010, filed Jul. 28, 2022, abandoned, and commonly-assigned U.S. Patent application, entitled "Feedback-Based Device for Nucleation Control," Ser. No. 17/875,957 filed Jul. 28, 2022, abandoned; agriculture as described in commonly-assigned U.S. Patent application, entitled "System and Method for Controlling Cell Functioning and Motility with the Aid of a Digital Computer," Ser. No. 17/876,065, filed Jul. 28, 2022, pending; lab grown material, including meat, as described in commonly-assigned U.S. Patent application, entitled "System and Method for Controlling Cellular Adhesion with the Aid of a Digital Computer," Ser. No. 17/876,072, filed Jul. 28, 2022, pending; and food as described in commonly-assigned U.S. Patent, entitled "System and Method for Metamaterial Array-Based Field-Shaping," U.S. Pat. No. 12,433,299 issued Oct. 7, 2025, the disclosures of which are incorporated by reference. Further, a receptacle packaging described in commonly-assigned U.S. Patent application, entitled "Contact Interfacing Material Receptacle," Ser. No. 17/875,991, filed Jul. 28, 2022, pending, the disclosure of which is incorporated by reference, can be used to hold the cells to which the field is being applied to prevent the cells from touching electrode contacts.

While the invention has been particularly shown and described as referenced to the embodiments thereof, those skilled in the art will understand that the foregoing and other changes in form and detail may be made therein without departing from the spirit and scope of the invention.

What is claimed is:

1. A method for feedback-based colloid phase change control, comprising:

obtaining values for one or more characteristics of an edible colloid at multiple time and space points via one or more sensors, the colloid comprising phases comprising a dispersed phase and a continuous phase;

receiving input comprising instructions for how quickly a phase change of only one of the phases is to occur;

determining an identity of the colloid based on the characteristic values at one of the time points;

determining using the input parameters for at least one field to be applied to the colloid by at least one field generator at one or more of the time points that occurred later the one time point, wherein the parameters for one of the later time points are further determined based on the identity and the parameters for the remaining later time points are further determined based on one of the identity and the characteristic values at that later time point; and controlling temperature and the phase change of the one phase of the colloid via application of the at least one field by the at least one field generator in accordance with the parameters determined at each of the later time points.

2. A method according to claim 1, wherein the field comprises one or more of a magnetic, electric, acoustic field, and electromagnetic field.

3. A method accordingly to claim 1, wherein the characteristics of the colloid comprise one or more of proportions of components of the colloid and identity of the components of the colloids.

4. A method according to claim 1, wherein the at least one sensor comprises one or more of an imaging sensor, reflective sensor, electrocurrent sensor, chemical sensor, electric sensor, acoustic sensor, optical sensor, electrochemical sensor, thermal sensor, or hyperspectral imaging sensor.

5. A method according to claim 1, wherein the field generators each comprise an electrode, magnet, wires, electromagnets, and an acoustic field generator.

6. A method according to claim 1, wherein the colloid is within a container before being put in proximity of the sensors and remains in the container when in the proximity of the sensors, further comprising:

obtaining characteristic values of the container using one or more of the sensors at one or more of the time points, wherein the parameters at one or more of the-later time points are further determined based on the container characteristic values.

7. A method according to claim 1, wherein the input further comprises a time that the colloid should stay at a below-freezing temperature.

8. A method according to claim 1, wherein the instructions comprise a time limit over which the phase change should occur.

9. A method according to claim 8, wherein the instructions comprise a time interval over which the phase change should occur and temperatures the colloid should be at during one or more points during the time interval.

10. A method according to claim 8, wherein the characteristics of the colloid comprise one or more of agglomeration and stability.

11. A method according to claim 1, wherein the obtaining of the characteristics and controlling the application of the at least one field by the at least one field generator is performed by a processor separate from a further processor performing a determination of the parameters, wherein the processor and the further processor a wirelessly interfaced.

12. A method according to claim 1, wherein the obtaining of the characteristics, controlling the application of the at least one field, and performing the determination of the parameters is performed by a single device.

13. A method according to claim 1, wherein the input is received from a computing device.

14. A method according to claim 1, wherein the input is user input.

* * * * *